(12) United States Patent
Chen

(10) Patent No.: US 11,216,635 B2
(45) Date of Patent: Jan. 4, 2022

(54) DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventor: Hui Chen, Hubei (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 429 days.

(21) Appl. No.: 16/477,698

(22) PCT Filed: Nov. 19, 2018

(86) PCT No.: PCT/CN2018/116083
§ 371 (c)(1),
(2) Date: Jul. 12, 2019

(87) PCT Pub. No.: WO2020/077721
PCT Pub. Date: Apr. 23, 2020

(65) Prior Publication Data
US 2021/0357609 A1 Nov. 18, 2021

(30) Foreign Application Priority Data

Oct. 15, 2018 (CN) .......................... 201811194368.0

(51) Int. Cl.
*G06K 9/00* (2006.01)
*G02F 1/1368* (2006.01)

(52) U.S. Cl.
CPC ......... *G06K 9/0004* (2013.01); *G02F 1/1368* (2013.01)

(58) Field of Classification Search
CPC ........................... G06K 9/0004; G02F 1/1368
See application file for complete search history.

(56) References Cited

U.S. PATENT DOCUMENTS

| 2013/0120760 | A1  | 5/2013  | Raguin et al. |
| 2017/0372113 | A1* | 12/2017 | Zhang .................. G06K 9/2036 |
| 2018/0121703 | A1  | 5/2018  | Jung et al. |

(Continued)

FOREIGN PATENT DOCUMENTS

| CN | 107025451 A | 8/2017 |
| CN | 107656665 A | 2/2018 |

(Continued)

*Primary Examiner* — Premal R Patel

(57) ABSTRACT

The application provides a display panel, including a plurality of pixel units, a circular polarizer and a plurality of fingerprint identification units disposed on the back of the base substrate. Each fingerprint identification unit disposes a linear polarized liquid crystal layer. A light emitted from each pixel unit is a linear polarized light, which is parallel to an absorption axis of the linear polarized liquid crystal layer. The fingerprint identification unit can realize the fingerprint identification according to the light being emitted from the pixel unit, passing through the circular polarizer to the finger, then being reflected back to the circular polarizer from the finger, and passing through the linear polarized liquid crystal layer.

18 Claims, 2 Drawing Sheets

(56) References Cited

U.S. PATENT DOCUMENTS

2018/0357462 A1* 12/2018 Mackey ............ G06K 9/00026
2020/0082145 A1    3/2020 Wang et al.

FOREIGN PATENT DOCUMENTS

| CN | 108021860 A | 5/2018 |
| CN | 108399352 A | 8/2018 |
| CN | 108596124 A | 9/2018 |

* cited by examiner

DISPLAY PANEL

BACKGROUND OF THE INVENTION

1. Field of the Invention

The present application relates to a display technical field, and more particularly to a display panel.

2. Description of the Prior Art

Fingerprints are the identity of everyone, so fingerprint identification is used as a way to unlock many products on the market, such as mobile phones, tablets and smart wearable devices. In use, users only need to touch a fingerprint identification sensor of the device with their fingers to realize login, which greatly improves the accuracy and speed of authorization authentication.

Existing fingerprint identification devices are all set in a non-display area of a display panel or on the back of a light side of a display device. Users need to use their hands and touch the specific fingerprint identification sensors outside the screen, which gives users certain limitations. In addition, the fingerprint identification sensor is placed in a non-display area of the display panel, which reduces the screen proportion, is not beautiful, and cannot achieve an absolute narrow border. If the fingerprint identification device is set on the display area of the display panel, this will greatly increase the screen proportion. In fact, this is the technology of fingerprint under the screen. However, because most of the pixel circuits in the display area of the display panel are made of metal materials by evaporation, in addition to the light reflected by the patterns on the fingers, the optical fingerprint identification sensor will also receive the light reflected from the metal and the light leaked down from the EL luminescent material. These noises affect the accuracy of fingerprint identification.

Hence, the prior art is defective and in urgent need of improvement.

Technical Problem

The present application provides a display panel, which can reduce noises of a sensor for optical fingerprint identification under screen and further improve its accuracy.

BRIEF SUMMARY OF THE INVENTION

Technical Solutions

In order to solve the above problems, the technical scheme provided in the application is as follows.

The application provides a display panel, comprising:
a base substrate;
a thin film transistor layer, being disposed on the base substrate;
a plurality of pixel units, being disposed on the thin film transistor layer;
a circular polarizer, being disposed on the pixel units;
a plurality of fingerprint identification units, being disposed on one side of the base substrate away from the pixel units, and each of the fingerprint identification units disposing a linear polarized liquid crystal layer; the fingerprint identification units being arranged in a grid and each of the fingerprint identification units being corresponding to a gap between two adjacent pixel units;

wherein, a light emitted from each pixel unit is a linear polarized light, and an absorption axis of the linear polarized liquid crystal layer is parallel to a polarization direction of the light emitted from the pixel unit; when a finger touches the display panel, the fingerprint identification unit is used for fingerprint identification according to the light being emitted from the pixel unit, passing through the circular polarizer to the finger, then being reflected back to the circular polarizer from the finger, and passing through the linear polarized liquid crystal layer.

In the display panel of the application, the display panel further includes a sensor on each of the fingerprint identification units; the linear polarized liquid crystal layer is disposed on the sensor; the sensor is used to convert the light, which passes through the linear polarized liquid crystal layer to the sensor, into an electrical signal and transmits the electrical signal to the fingerprint identification unit.

In the display panel of the application, the fingerprint identification unit is corresponding to the gap between the two adjacent pixel units, and the light reflected from the finger is transmitted to the linear polarized liquid crystal layer via the gap between the two adjacent pixel units.

In the display panel of the application, widths of the linear polarized liquid crystal layer and the sensor are greater than a width of the gap between the two adjacent pixel units.

In the display panel of the application, the display panel further includes an encapsulation layer disposed on the pixel units; the circular polarizer includes a quarter wave plate attached to a surface of the encapsulation layer and a linear polarizer disposed on the quarter wave plate.

In the display panel of the application, an absorption axis of the linear polarizer is perpendicular to a polarization direction of the light emitted from the pixel unit.

In the display panel of the application, the fingerprint identification units are disposed on an external surface or an internal surface of the encapsulating layer and each of the fingerprint identification units is corresponding to the gap between the two adjacent pixel units.

In the display panel of the application, the fingerprint identification units are disposed in the base substrate and each of the fingerprint identification units is corresponding to the gap between the two adjacent pixel units.

In the display panel of the application, the fingerprint identification units and the pixel units are set in the same layer, and each fingerprint identification unit is corresponding to the gap between the two adjacent pixel units.

In order to solve the above problems, the application further provides a display panel, comprising:
a base substrate;
a thin film transistor layer, being disposed on the base substrate;
a plurality of pixel units, being disposed on the thin film transistor layer;
a circular polarizer, being disposed on the pixel units;
a plurality of fingerprint identification units, being disposed on one side of the base substrate away from the pixel units, and each of the fingerprint identification units disposing a linear polarized liquid crystal layer;

wherein, a light emitted from each pixel unit is a linear polarized light, and an absorption axis of the linear polarized liquid crystal layer is parallel to a polarization direction of the light emitted from the pixel unit; when a finger touches the display panel, the fingerprint identification unit is used for fingerprint identification according to the light being emitted from the pixel unit, passing through the circular polarizer to the finger, then being reflected back to the circular polarizer from the finger, and passing through the linear polarized liquid crystal layer.

In the display panel of the application, the display panel further includes a sensor on each of the fingerprint identification units; the linear polarized liquid crystal layer is disposed on the sensor; the sensor is used to convert the light, which passes through the linear polarized liquid crystal layer to the sensor, into an electrical signal and transmits the electrical signal to the fingerprint identification unit.

In the display panel of the application, the fingerprint identification unit is corresponding to a gap between two adjacent pixel units, and the light reflected from the finger is transmitted to the linear polarized liquid crystal layer via the gap between the two adjacent pixel units.

In the display panel of the application, widths of the linear polarized liquid crystal layer and the sensor are greater than a width of the gap between the two adjacent pixel units.

In the display panel of the application, the display panel further includes an encapsulation layer disposed on the pixel units; the circular polarizer includes a quarter wave plate attached to a surface of the encapsulation layer and a linear polarizer disposed on the quarter wave plate.

In the display panel of the application, an absorption axis of the linear polarizer is perpendicular to a polarization direction of the light emitted from the pixel unit.

In the display panel of the application, the fingerprint identification units are disposed on an external surface or an internal surface of the encapsulating layer and each of the fingerprint identification units is corresponding to a gap between two adjacent pixel units.

In the display panel of the application, the fingerprint identification units are disposed in the base substrate and each of the fingerprint identification units is corresponding to a gap between two adjacent pixel units.

In the display panel of the application, the fingerprint identification units and the pixel units are set in the same layer, and each fingerprint identification unit is corresponding to a gap between two adjacent pixel units.

Beneficial Effect

The beneficial effects of the application are as follows: in comparison with the prior display panel, the display panel provided by the application has the linear polarized liquid crystal layer coated on the sensor for optical fingerprint identification under screen. The absorption axis of the linear polarized liquid crystal layer is parallel to the polarization direction of the light emitted by the organic light-emitting unit, so the sensor for optical fingerprint identification under screen cannot receive the noise from the organic light-emitting unit and directly irradiated to the sensor, and only receive the light reflected by the fingerprint. The display panel can reduce noises and improve accuracy of the sensor for optical fingerprint identification under screen.

BRIEF DESCRIPTION OF THE DRAWINGS

For more clearly illustrating the technical scheme in the embodiment or the prior art, the following text will briefly introduce the accompanying drawings used in the embodiment or the prior art. It is obvious that the accompanying drawings in the following description are only some embodiments of the present application. For the technical personnel of the field, other drawings can also be obtained from these drawings without paying creative work.

DETAILED DESCRIPTION OF THE PREFERRED EMBODIMENTS

The following description of every embodiment with reference to the accompanying drawings is used to exemplify a specific embodiment, which may be carried out in the application. Directional terms mentioned in the present invention, such as "up", "down", "front", "back", "left", "right", "inside", "outside", "side" etc., are only used with reference to the orientation of the accompanying drawings. Therefore, the used directional terms are intended to illustrate, but not to limit, the application. In the figure, units with similar structures are represented by the same label.

For the display panel of the prior art, the optical fingerprint identification sensor receives not only the light reflected by the fingerprint, but also the light reflected by the metal and the light leaked from the organic light-emitting material downward. However, these noises will affect the technical problem of fingerprint identification accuracy. The embodiment can solve this defect.

Figure 1:
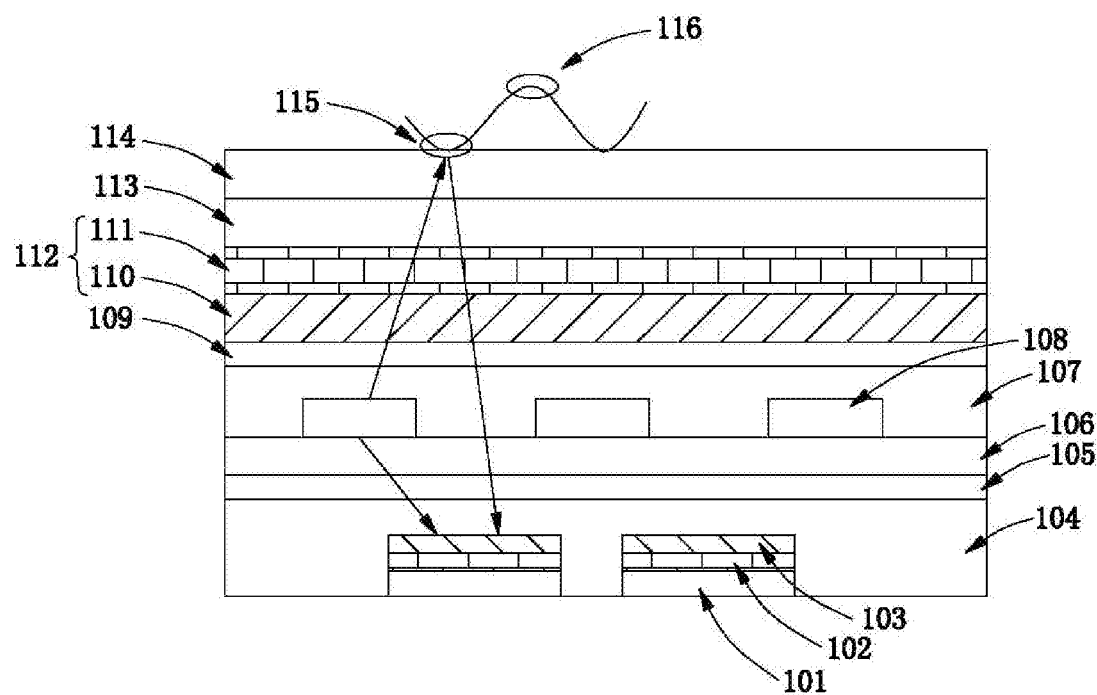
FIG. 1 is a structural schematic view of a display panel provided by one embodiment of the application.

Referring to FIG. 1, it is a structural schematic view of a display panel provided by one embodiment of the application. The display panel includes: a base substrate 105; a thin film transistor layer 106 being disposed on the base substrate 105; a pixel layer 107 being disposed on the thin film transistor layer 106; a plurality of pixel units 108 being distributed in array in the pixel layer 107 and including an anode layer, an organic luminescence layer and a cathode layer, which are arranged in layers; an encapsulation layer 109 being disposed on the pixel layer 107; a circular polarizer 112 being disposed on the encapsulation layer 109 and including a quarter wave plate 110 attached to a surface of the encapsulation layer 109 and a linear polarizer 111 disposed on the quarter wave plate 110; a touch layer 113 being disposed on the circular polarizer 112; a protection plate 114 being disposed on the touch layer 113; and a fingerprint identification film layer 104 being disposed on one surface of the base substrate 105 away from the pixel units 108 and including a plurality of fingerprint identification units 101 in array distribution and each of the fingerprint identification unit 101 being successively stacked with a sensor 102 and a linear polarized liquid crystal layer 103. Wherein, a light emitted from each pixel unit 108 is a linear polarized light, and the linear polarized liquid crystal layer 103 has an absorption axis parallel to a polarization direction of the light emitted from the pixel unit 108. When a finger touches the display panel, the sensor 102 can receive the light, which is emitted from the pixel unit 108, passes through the circular polarizer 112 to ridges 115 or valleys 116 of the finger, then is reflected back to the circular polarizer 112 from the finger, and transmits through the linear polarized liquid crystal layer 103. The light reaching the sensor 102 can be converted into an electrical signal by the sensor 102 and be transmitted to the fingerprint identification unit 101 for fingerprint identification.

Wherein, the fingerprint identification unit 101 is arranged corresponding to a gap between two adjacent pixel units 108, and the light reflected back from the finger directly reaches the linear polarized liquid crystal layer 103 via the gap between the two adjacent pixel units 108. The linear polarized liquid crystal layer 103 and the sensor 102 are corresponding to the fingerprint identification unit 101 and are arranged in array distribution.

Wherein the widths of the linear polarized liquid crystal layer 103, the sensor 102 and the fingerprint identification unit 101 are greater than a width of the gap between the two adjacent pixel units 108, so that the light via the gap between the two adjacent pixel units 108 can be more illuminated on the sensor 102 to enhance the fingerprint identification ability.

Moreover, the linear polarizer 111 has an absorption axis perpendicular to the polarization direction of the light emitted from the pixel unit 108, so the polarization direction of the light emitted from the pixel unit 108 remains unchanged after passing through the linear polarizer 111.

In other embodiments, the fingerprint identification units 101 may be also disposed on other layers of the display panel. For example, the fingerprint identification units 101 are disposed on an external surface or an internal surface of the encapsulating layer 109 and each of them is corresponding to the gap between the two adjacent pixel units 108. Correspondingly, the sensor 102 and the linear polarized liquid crystal layer 103 are arranged in the same manner as in the above embodiment, and are disposed on the fingerprint identification unit 101 in turn. It is noteworthy that, the fingerprint identification unit 101, the sensor 102 and the linear polarized liquid crystal layer 103 are falling within the range of the gap between the two adjacent pixel units 108 to avoid affecting a pixel opening of the pixel unit 108.

Or, the fingerprint identification units 101 and the pixel units 108 are set in the same layer, and each fingerprint identification unit 101 is corresponding to the gap between the two adjacent pixel units 108. Each fingerprint identification unit 101 is insulated from the surrounding pixel units 108. The sensor 102 and the linear polarized liquid crystal layer 103 are stacked on the corresponding fingerprint identification unit 101.

Or maybe, the fingerprint identification units 101 are disposed in the base substrate 105 and each of them is corresponding to the gap between the two adjacent pixel units 108. The fingerprint identification unit 101 is insulated from the thin film transistor layer 106. The sensor 102 and the linear polarized liquid crystal layer 103 are stacked on the corresponding fingerprint identification unit 101.

Wherein, the fingerprint identification units 101 are arranged like a grid, and each of them is corresponding to the gap between the two adjacent pixel units 108.

Figure 2:
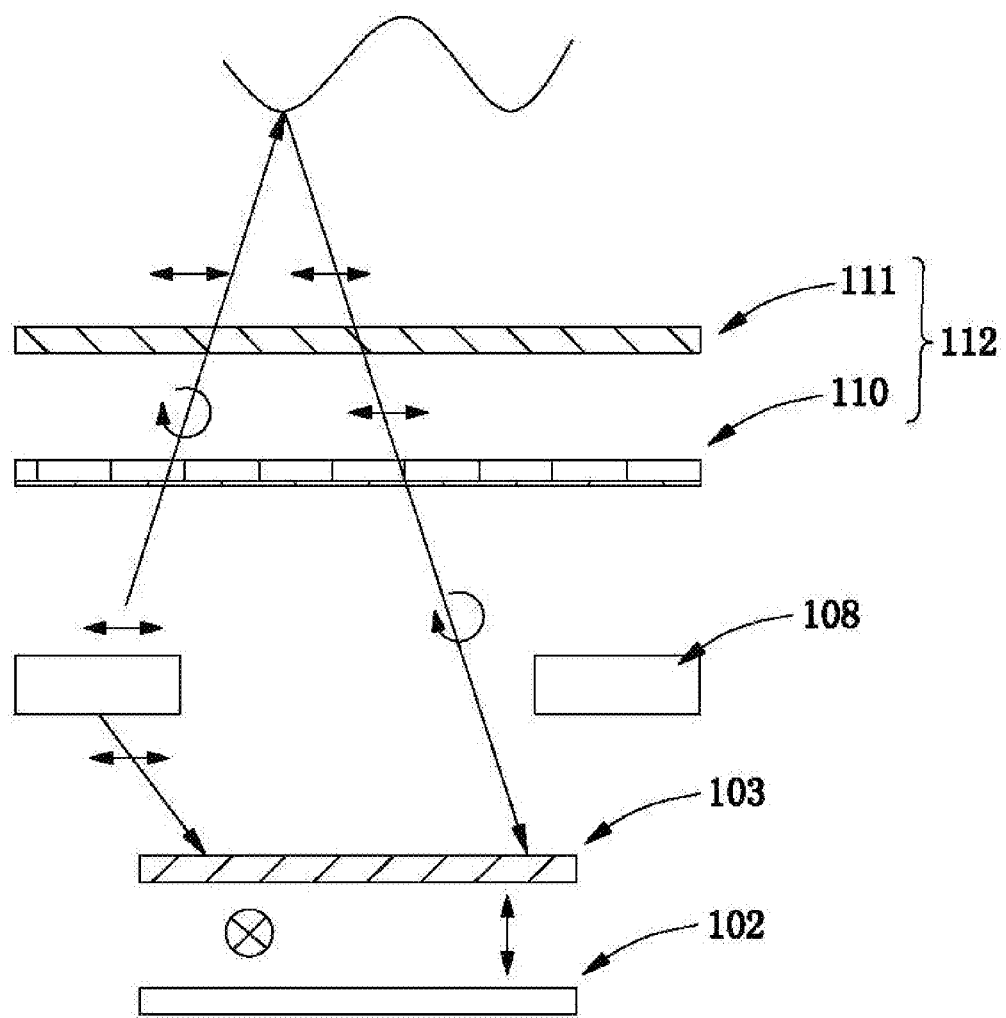
FIG. 2 is a schematic diagram of the fingerprint identification principle of the display panel provided by one embodiment of the application.

As shown in FIG. 2, it is a schematic diagram of the fingerprint identification principle of the display panel provided by one embodiment of the application, and way light travels are shown by the arrow in the figure. The pixel unit 108 is an organic light-emitting material, and the pixel unit 108 emits a transverse linear polarized light. The transverse linear polarized light can be transmitted upward through the quarter wave plate 110 of the circular polarizer 112 and becomes a circular polarized light; then the circular polarized light passes through the linear polarizer 111 and then becomes the transverse linear polarized light. Next, the transverse linear polarized light can be reflected when it is transmitted to the ridges or valleys of the finger fingerprint. This reflection does not change the polarization state of the transverse linear polarized light. Therefore, the transverse linear polarized light after reflected can pass through the linear polarizer 111 again and keep the polarization state of the transverse linear polarized light, then it passes through the quarter wave plate 110 for the second time and becomes the circular polarized light again. Because the linear polarized liquid crystal layer 103, which is coated on the sensor 102 for optical fingerprint identification under screen, has the absorption axis parallel to the polarization direction of the light emitted from the pixel unit 108, a vertical linear polarized light in the circular polarized light can be illuminated to the sensor 102 through the linear polarized liquid crystal layer 103, and then can be recognized by a photoelectric converter as a signal.

Thus, only the light reflected by the fingerprint can enter into the sensor 102, while the light reflected by the light source and other metal electrodes cannot penetrate the linear polarized liquid crystal layer 103 into the sensor 102, thereby improving the accuracy of the sensor 102.

Wherein, the pixel unit 108 emits the transverse linear polarized light for example only, and of course it can also emit a vertical linear polarized light, so no restriction is made here, as long as the absorption axis of the linear polarized liquid crystal layer 103 is parallel to the polarization direction of the light emitted by the pixel unit 108.

The present application provides the display panel, which has the linear polarized liquid crystal layer coated on the sensor for optical fingerprint identification under screen. The absorption axis of the linear polarized liquid crystal layer is parallel to the polarization direction of the light emitted by the organic light-emitting unit, so the sensor for optical fingerprint identification under screen cannot receive the noise from the organic light-emitting unit and directly irradiated to the sensor, and only receive the light reflected by the fingerprint. The display panel can reduce noises and improve accuracy of the sensor for optical fingerprint identification under screen.

As described above, although the application has been disclosed in the preferred embodiments as above, the preferred embodiments mentioned above are not intended to limit the application. The ordinary technical personnel in the field may make various changes and embellishments without departing from the spirit and scope of the application. Therefore, the scope of protection of the application is subject to the scope defined by the claims.

What is claimed is:

1. A display panel, comprising:
    a base substrate;
    a thin film transistor layer, being disposed on the base substrate;
    a plurality of pixel units, being disposed on the thin film transistor layer;
    a circular polarizer, being disposed on the pixel units;
    a plurality of fingerprint identification units, being disposed on one side of the base substrate away from the pixel units, and each of the fingerprint identification units disposing a linear polarized liquid crystal layer; the fingerprint identification units being arranged in a grid and each of the fingerprint identification units being corresponding to a gap between two adjacent pixel units;
    wherein, a light emitted from each pixel unit is a linear polarized light, and an absorption axis of the linear polarized liquid crystal layer is parallel to a polarization direction of the light emitted from the pixel unit; when a finger touches the display panel, the fingerprint identification unit is used for fingerprint identification according to the light being emitted from the pixel unit, passing through the circular polarizer to the finger, then being reflected back to the circular polarizer from the finger, and passing through the linear polarized liquid crystal layer.

2. The display panel as claimed in claim 1, wherein the display panel further includes a sensor on each of the fingerprint identification units; the linear polarized liquid crystal layer is disposed on the sensor; the sensor is used to convert the light, which passes through the linear polarized liquid crystal layer to the sensor, into an electrical signal and transmits the electrical signal to the fingerprint identification unit.

3. The display panel as claimed in claim 2, wherein the fingerprint identification unit is corresponding to the gap between the two adjacent pixel units, and the light reflected from the finger is transmitted to the linear polarized liquid crystal layer via the gap between the two adjacent pixel units.

4. The display panel as claimed in claim 3, wherein widths of the linear polarized liquid crystal layer and the sensor are greater than a width of the gap between the two adjacent pixel units.

5. The display panel as claimed in claim 1, wherein the display panel further includes an encapsulation layer disposed on the pixel units; the circular polarizer includes a quarter wave plate attached to a surface of the encapsulation layer and a linear polarizer disposed on the quarter wave plate.

6. The display panel as claimed in claim 5, wherein an absorption axis of the linear polarizer is perpendicular to a polarization direction of the light emitted from the pixel unit.

7. The display panel as claimed in claim 5, wherein the fingerprint identification units are disposed on an external surface or an internal surface of the encapsulating layer and each of the fingerprint identification units is corresponding to the gap between the two adjacent pixel units.

8. The display panel as claimed in claim 1, wherein the fingerprint identification units are disposed in the base substrate and each of the fingerprint identification units is corresponding to the gap between the two adjacent pixel units.

9. The display panel as claimed in claim 1, wherein the fingerprint identification units and the pixel units are set in the same layer, and each fingerprint identification unit is corresponding to the gap between the two adjacent pixel units.

10. A display panel, comprising:
a base substrate;
a thin film transistor layer, being disposed on the base substrate;
a plurality of pixel units, being disposed on the thin film transistor layer;
a circular polarizer, being disposed on the pixel units;
a plurality of fingerprint identification units, being disposed on one side of the base substrate away from the pixel units, and each of the fingerprint identification units disposing a linear polarized liquid crystal layer;
wherein, a light emitted from each pixel unit is a linear polarized light, and an absorption axis of the linear polarized liquid crystal layer is parallel to a polarization direction of the light emitted from the pixel unit; when a finger touches the display panel, the fingerprint identification unit is used for fingerprint identification according to the light being emitted from the pixel unit, passing through the circular polarizer to the finger, then being reflected back to the circular polarizer from the finger, and passing through the linear polarized liquid crystal layer.

11. The display panel as claimed in claim 10, wherein the display panel further includes a sensor on each of the fingerprint identification units; the linear polarized liquid crystal layer is disposed on the sensor; the sensor is used to convert the light, which passes through the linear polarized liquid crystal layer to the sensor, into an electrical signal and transmits the electrical signal to the fingerprint identification unit.

12. The display panel as claimed in claim 11, wherein the fingerprint identification unit is corresponding to a gap between two adjacent pixel units, and the light reflected from the finger is transmitted to the linear polarized liquid crystal layer via the gap between the two adjacent pixel units.

13. The display panel as claimed in claim 12, wherein widths of the linear polarized liquid crystal layer and the sensor are greater than a width of the gap between the two adjacent pixel units.

14. The display panel as claimed in claim 10, wherein the display panel further includes an encapsulation layer disposed on the pixel units; the circular polarizer includes a quarter wave plate attached to a surface of the encapsulation layer and a linear polarizer disposed on the quarter wave plate.

15. The display panel as claimed in claim 14, wherein an absorption axis of the linear polarizer is perpendicular to a polarization direction of the light emitted from the pixel unit.

16. The display panel as claimed in claim 14, wherein the fingerprint identification units are disposed on an external surface or an internal surface of the encapsulating layer and each of the fingerprint identification units is corresponding to a gap between two adjacent pixel units.

17. The display panel as claimed in claim 10, wherein the fingerprint identification units are disposed in the base substrate and each of the fingerprint identification units is corresponding to a gap between two adjacent pixel units.

18. The display panel as claimed in claim 10, wherein the fingerprint identification units and the pixel units are set in the same layer, and each fingerprint identification unit is corresponding to a gap between two adjacent pixel units.

* * * * *